Oct. 16, 1962 TING LI CHU ETAL 3,058,812
PROCESS AND APPARATUS FOR PRODUCING SILICON
Filed May 29, 1958
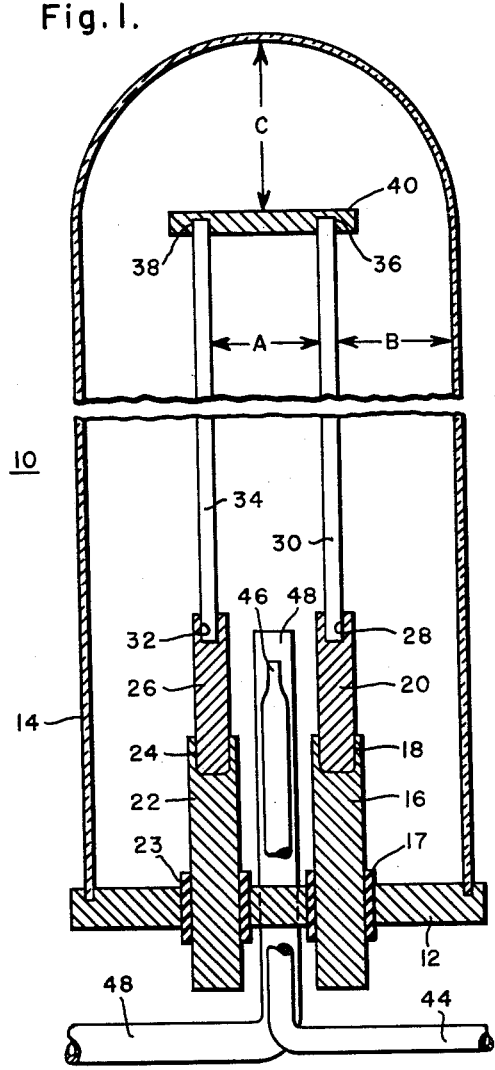
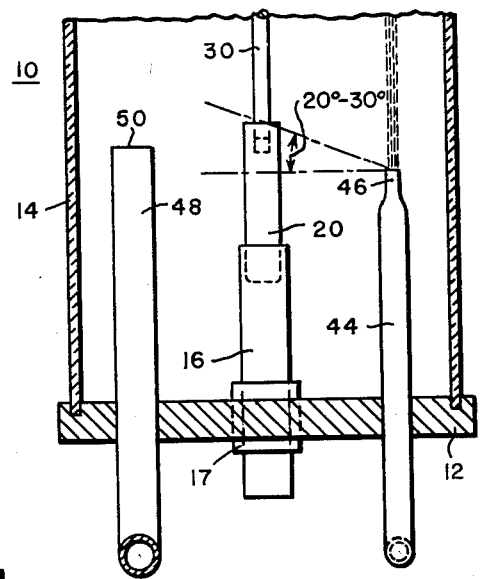
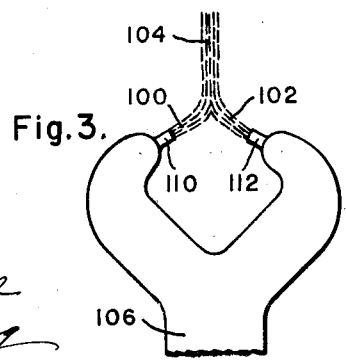
WITNESSES:
W. C. Groome
James F. Young
INVENTORS
Richard L. Longini &
Ting Li Chu.
BY Frederick Shapoe
ATTORNEY

United States Patent Office 3,058,812
Patented Oct. 16, 1962

3,058,812
PROCESS AND APPARATUS FOR PRODUCING SILICON
Ting Li Chu and Richard L. Longini, Pittsburgh, Pa., assignors to Westinghouse Electric Corporation, East Pittsburgh, Pa., a corporation of Pennsylvania
Filed May 29, 1958, Ser. No. 738,821
7 Claims. (Cl. 23—223.5)

This invention relates to apparatus and the process for thermally reducing silicon compounds in order to produce pure silicon.

While it is known that halogenated silicon compounds may be admixed with a reducing gas such as hydrogen and the resulting gas mixture when subjected to a high temperature will yield silicon metal, numerous problems have arisen in connection with the preparation of sound, relatively gas-free members comprising extremely pure silicon. Furthermore, the rate of free silicon produced by the processes known heretofore in apparatus previously employed, has been quite low. The efficiency of the reduction namely, the proportion of the halogenated silane thus decomposed, has been only moderate. If a high rate of decomposition of silicon is attempted the efficiency of the reduction process is drastically reduced and the quality of the silicon members is inferior.

As an example, in apparatus that has been employed heretofore, in a quartz reaction chamber in which are disposed two filaments of silicon of an initial diameter of .12 inch and 8 inches in length, the filaments being heated to an elevated temperature of about 1150° C., a mixture of hydrogen and trichlorosilane in the mol ratio of 8 to 1 is introduced into the reaction chamber surrounding the filaments at a flow rate of 1.25 liters per minute. This apparatus produces silicon at a rate of 3.2 grams per hour. The efficiency under these conditions is approximately 30 percent, that is 30% of the silicon in the trichlorosilane being introduced deposits on the filaments. It will be appreciated that this rate of deposition of silicon is quite low so that several days' continuous operation are required to deposit enough silicon on the filaments to produce silicon rods of a diameter of ½ inch. Furthermore, the electrical energy required to maintain the silicon filaments at the temperature necessary to cause thermal decomposition of the gas mixture is approximately 0.8 kilowatt hour per gram of silicon deposited. Consequently, the energy requirements for carrying out the reaction are quite substantial.

The object of the present invention is to provide apparatus for carrying out the thermal reduction of a halogenated silane at a high rate and with a relatively high efficiency while maintaining excellent homogeneity and a high degree of soundness of the silicon so produced.

A further object of the invention is to greatly expedite the reaction rate at which halogenated silanes are reduced with low amounts of electrical energy being required while maintaining a high quality of silicon deposit.

A still further object of the invention is to provide a process for conducting the reduction of halogenated silanes with hydrogen so that the rate of deposition of free silicon is greatly increased with a relatively high efficiency of decomposition of the gas, greatly reduced energy requirements while maintaining a high quality of pure silicon deposit.

Other objects of the invention will, in part, be obvious and will, in part, appear hereinafter.

For a better understanding of the nature and objects of the invention, reference may be had to the following detailed description taken in conjunction with the accompanying drawing, in which:

FIGURE 1 is a vertically cross section through a reaction chamber constructed in accordance with the present invention;

FIG. 2 is a fragmentary view in elevation of a portion of the apparatus of the invention; and FIG. 3 is a fragmentary view in elevation of a portion of a modified form of the apparatus.

It has been discovered that the reduction of a halogenated silane in admixture with hydrogen within certain proportions may be so carried out, employing apparatus constructed in accordance with critical requirements and following critical processing conditions, that a high rate of deposition of pure silicon on heated filaments may be accomplished, while concurrently providing that a relatively high proportion of the silane is reduced to silicon, and with lower energy being required per gram of silicon to maintain the filaments at the temperatures necessary to cause the thermal reduction to take place.

The present invention may be applied to the thermal reduction of vapors of various halogenated silane compounds such, for example, as silicon tetrachloride, trichlorosilane, dichlorosilane, and silicon tetraiodide. Hereafter specific reference will be made to trichlorosilane, $HSiCl_3$, but it will be understood other halogenated silanes may be employed in a similar manner. In carrying out the thermal reduction the trichlorosilane is admixed with hydrogen in mol proportion providing from 6 to 30 mols of hydrogen per mol of trichlorosilane. Preferred proportions of hydrogen to the trichlorosilane are from 12:1 to 18:1.

The reaction of the hydrogen and trichlorosilane is in accordance with the following equation:

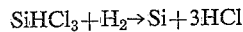

It will be noted that silicon in the free form is produced with hydrogen chloride gas being evolved. However, incomplete reduction may take place which will result in intermediate silane products of various types. The thermal decomposition of the hydrogen-trichlorosilane mixture is most pronounced when the gas mixture is subjected to temperatures of above 1000° C., which temperatures can be produced by heating a suitable filament, preferably a silicon rod. The silicon resulting from the reduction deposits on the filament or rod. The rod or filament will vary appreciably in temperature from spot to spot when gas circulation is irregular or non-uniform thereat. At those portions where gas circulation is poor the rod becomes much hotter and silicon deposited on such excessively heated portions exhibits a blister-like surface which is characteristic of a gas inclusion. If during succeeding processing the silicon rod is subjected to zone refining or melting under vacuum this blister-like portion of the silicon rod will blow apart. At high rates of deposition the quality of the deposited silicon on the filament becomes progressively more critically affected by variables in the local temperature of the filament and gas circulation so that it becomes extremely difficult to produce uniform and smooth deposits substantially free from any entrapped gases. Under some circumstances a rough surfaced deposit of silicon may result and such rough surfaces further accentuate undesirable types of silicon deposition.

When gas circulation at some point along a filament is low then a substantial laminar layer of reduced gas is present at the surface of the silicon filament. Under these conditions, silicon first deposits in the form of needles or projections at separated points along the filament. Then, since the tips of the needles or other projections will be more favorably situated, silicon will deposit on the tips to form a nodular structure which eventually grows to a relatively great size and eventually joins adjacent nodules and thereby traps gas in the underlying portions. In the description of this invention, the terms "smooth" and "uniform" particularly refer to a non-nodular type of deposit.

It has been discovered that best results are obtained using a pair of filaments of silicon each longer than 12 inches in the reaction chamber. Exceptionally good results are obtained when the filaments are 18 inches and longer. The filaments should be spaced at least 1½ inches apart and each should be at least 1 inch from the walls of the reaction chamber. Since some silicon is deposited on the walls of the reaction chamber, such walls usually being quartz, these deposits of silicon tend to flake off during the operation of the apparatus and such flakes at times are carried by the gas stream and deposited on the silicon filaments so that non-uniform areas occur on the filaments with consequent damage thereto and unsatisfactory operation will occur. By maintaining the chamber walls at least an inch away from the filaments such undesirable contamination is greatly minimized or eliminated for practical purposes. Chamber diameters of adequate size are obtained when the diameter is from about 22% to 33% of the length of the filaments.

It has been found to be highly critical that the mixture of hydrogen and trichlorosilane be injected into the reaction chamber at an extremely high velocity of at least 200 meters per second and preferably 500 meters per second and higher. This may be accomplished by employing a jet like tip on the inlet tube which introduces the gas mixture into the reaction chamber. The gas mixture must be introduced at a substantial rate of the order of 5 liters per minute and more, into a reaction chamber in which the filaments are 18 inches in length.

Important in the reaction is the placement of the inlet jet with respect to the filaments. The jet should be placed symmetrically with respect to the filaments and it should inject the reaction mixture substantially parallel to the filaments. Since for ordinary practice the reaction chamber will be a vertically disposed circular cylinder in which the filaments will be vertically disposed, the jet will direct the gas mixture substantially vertically. Furthermore, the bottom of the jet should be slightly below the bottom end of the filaments. For optimum results, it has been found that the angle between a line drawn from the bottom of one filament to the jet should be approximately 20° to 30° with respect to the horizontal plane at the jet tip. The apparatus need not be vertical, but may be disposed at an angle or even be horizontal, the filaments and direction of the jets will be substantially parallel to each other.

When the hydrogen-trichlorosilane gas is injected into the gas chamber at the high velocity, for example 500 meters per second, a substantial amount of energy is imparted to the gas. Not only is there produced a high degree of gas mass turbulence, or eddy currents, throughout the reaction chamber but the energy in the gas results in a high degree of microturbulence. Such microturbulence has been found to be highly effective in penetrating the laminar layer of gases surrounding the heated filaments. This laminar layer of gas surrounding the filaments comprises a high proportion of hydrogen-chloride resulting from the reduction reaction. The highly microturbulent injected gas will penetrate and sweep away the laminar layer and replace it with trichlorosilane and hydrogen, whereby improved thermal reduction and a higher rate of deposition of silicon on the filaments will take place.

In order to make sure that high jet velocities are produced in order to promote turbulence and microturbulence the tip of the gas inlet tube should not exceed 0.10 inch and preferably be less than 0.05 inch in diameter. In some cases two or more fine jet tips may be employed in a cluster. As shown in FIG. 3, two impinging gas jets 100 and 102 meet at an angle and produce a highly microturbulent stream 104 which is directed vertically.

The jets 100 and 102 issue from a glass tube 106 which has a bifurcated head 108 terminating in oppositely disposed jet tips 110 and 112.

Reference should be made to the drawing which illustrates apparatus constructed in accordance with the invention. In FIG. 1, the entire reaction apparatus 10 comprises a base 12 on which is mounted a cylindrical reaction vessel 14 preferably constructed of quartz. It will be appreciated that a gas tight seal is maintained between the vessel 14 and the base 12. Passing through the base 12 are electrodes 16 and 22, for example of silver, which are insulated by suitably electrical insulating sleeves 17 and 23. In the upper ends of the electrodes 16 and 22 are provided recesses 18 and 24 respectively in which are placed pure graphite electrodes 20 and 26. In the upper ends of the graphite electrodes are elongated recesses 28 and 32 in which are placed the lower ends of closely fitting silicon filaments 30 and 34 respectively. The upper end of the graphite electrode should be spaced from the base 12 a minimum distance equal to the diameter of the cylinder vessel 14. The upper ends of the silicon filaments fit snugly into recesses 36 and 38 of a graphite bridge 40. Electrical current, either A.C. or D.C., may be applied to the electrodes 16 and 22, respectively, from which it passes to the graphite electrodes, thence to the silicon filaments 30 and 34, respectively, and thence to be conducted by the bridge 40 to complete the circuit. The space A between the filaments should be at least 1½ inches, center to center, and preferably from 1¾ to 2 inches for filaments 18 inches in length measured from the graphite bridge to the top of the graphite electrodes 20 and 26. The dimension B should be 1 inch or greater. The distance C from the graphite bridge 40 to the top of the cylinder should be at least equal to the radius of the cylinder vessel 14.

The inside diameter of the vessel 14 should be proportioned to the length of the filaments 30 and 34. For best results the internal diameter of the reaction vessel is between 22 percent and 33 percent of the length of the filaments. If the reactor vessel is less than 22 percent then undesirable effects are produced such as excessive deposits on the wall of the vessel and a greater chance of contaminating the rods. When the diameter of the vessel 14 exceeds 33 percent of the length of the silicon filaments, then the gas volume becomes so great that the turbulence and eddy currents produced by the jet are less effective and the efficiency of the reduction process decreases rapidly.

Passing through the base 12 is an inlet tube 44 terminating in a jet tip 46 of a diameter of not in excess of 0.1 inch and preferably below 0.05 inch, consistent with the velocity required and the volume of reactants used. The tube 44 is disposed symmetrical with respect to the two filaments and it is located on one side of the plane defined by the two filaments 30 and 34.

An outlet tube 48 is symmetrically disposed on the opposite side of the plane defined by the filaments from the inlet tube 44. As illustrated in FIG. 2 of the drawing, the tip 46 of the tube 44 is slightly below the plane at the bottom end of the filaments. An angle of between 20° to 30° is formed by a line from the tip 46 to the bottom of the filament 34 with respect to the horizontal plane. Also the top end 50 of the outlet tube 48 is shown as being slightly above the top of the jet tip 46. The top end 50 of the outlet tube 48 may be at approximately the same level as the top of the graphite electrode 20 or it may be lower, even substantially below the tip 46, without any significant undesirable results as long as it is below the top end of graphite electrode 20 and is spaced away from the electrodes, preferably near the wall 14.

The following examples are illustrative of the teachings of this invention:

*Example I*

A cylindrical quartz reaction chamber of an inside diameter of 4 inches was provided with two filaments comprising circular rods of silicon of a diameter of ⅛ inch and 18 inches long, the rods being spaced approximately 1¾ inches center to center. Into this chamber there was introduced a gas comprising a mixture of hydrogen and trichlorosilane in a ratio of 16.6 mols to 1 mol, respectively. The inlet jet was disposed approximately 25° with respect to the horizontal plane and the plane from the tip to the bottom end of one filament. The distance of the jet to the center line of the filaments was 1⅝ inches. The inside diameter of the jet was 0.0465 inch and the gas velocity was maintained at approximately 500 meters per second at a flow rate of 30.2 liters per minute. The filaments were energized by passing electrical current through until their temperature was approximately 1150° C. Silicon was deposited as a smooth uniform coating at the rate of 34 grams an hour. The yield was 26 percent of the trichlorosilane introduced. Under the operating conditions of this example the electrical energy consumption to maintain the filaments at temperature was 0.2 kilowatt hour per gram of silicon. This amount of power is approximately 25% of that required in the illustration given earlier in connection with filaments 8 inches in length using slow deposition methods.

*Example II*

The apparatus of Example I was employed with the exception that the silicon rods were 8 inches in length, all the other conditions being equal. The yield of silicon was only 21 percent and the silicon deposits contained entrapped gases.

*Example III*

Into a reaction chamber constructed as indicated in Example I there is introduced a gas mixture at the rate of 30 liters per minute, the mixture having a hydrogen to trichlorosilane mol ratio of 15 to 1. The gas velocity was approximately 500 meters per second. The deposition of silicon was at the rate of 30 grams per hour and the efficiency of decomposition was approximately 26 percent.

In this Example III the inlet jet was changed to one having a tip of an internal diameter ⅛ inch. The efficiency of deposition decreased to 23 percent. However, more importantly, the silicon formed a rod that had an extremely rough surface with an contained entrapped gases.

As a further variation of this Example III, the diameter of the quartz vessel forming the reaction chamber was increased to 9 inches inside diameter. The efficiency of decomposition of the trichlorosilane dropped considerably below 20 percent.

As a still further variation of this Example III, a quartz cylinder vessel having an inside diameter of approximately 3 inches was substituted for the 4 inch diameter vessel. Considerable deterioration in the operation of the apparatus became apparent. Non-uniform temperatures on the filaments were apparent; lower yields of silicon resulted; and the walls of the quartz chamber acquired thick, dark deposits which tended to peel and flake off with resulting contamination of the silicon rods.

It will be understood that the above description is illustrative and not limiting.

We claim as our invention:

1. In apparatus for carrying out the thermal reduction of a halogenated silane with hydrogen in a cylindrical reactor chamber having disposed at one end gas inlet and outlet means for the halogenated silane and hydrogen and the reaction products thereof, and depositing silicon so produced by the thermal reduction on a pair of electrically heated filaments, said filaments being electrically connected in a series circuit relationship at a point adjacent the other end of the chamber, in combination, the cylindrical reactor chamber having a substantially circular cross-section having an inside diameter of from 22% to 33% of the length of the filaments, electrical means for heating the filaments over their entire exposed length to a substantially uniform temperature sufficient to decompose the silane gas, and the filaments being at least 18 inches in length and spaced at least 1½ inches apart and being at least 1 inch from the walls of the reactor chamber.

2. In apparatus for carrying out the thermal reduction of a halogenated silane with hydrogen in a cylindrical reactor chamber and depositing silicon so produced on a pair of electrically heated filaments, said filaments being electrically connected in a series circuit relationship with each other and an electrical power source, in combination, a gas inlet tube for admitting a mixture of hydrogen and the halogenated silane into the reaction chamber in a direction substantially parallel to the filaments, the gas inlet tube being disposed at one end of the cylindrical reactor chamber and being spaced symmetrically with respect to the filaments, the tip of the gas inlet tube being below the bottom of the filaments and the line from the tip of the gas inlet tube to the bottom of a filament forming an angle of between 20° and 30° with respect to the perpendicular to the filaments, the tip of the gas inlet tube having a diameter of not over 0.10 inch, and a gas outlet tube disposed at the same end of the reaction chamber as the gas inlet tube but on the opposite side of the filaments from the gas inlet tube, said gas inlet tube and gas outlet tube being at the opposite end of the reaction chamber from the point where the two filaments are electrically connected in a series circuit relationship with each other.

3. In apparatus for carrying out the thermal reduction of a halogenated silane with hydrogen in a cylindrical reactor chamber and depositing silicon so produced on a pair of electrically heated filaments, the filaments having a lower end supported from the bottom of the reactor chamber, and the upper ends connected by a graphite bridge spaced from the upper end of cylindrical reactor chamber a distance at least as great as the radius of the chamber, in combination, the cylindrical reactor chamber being of substantially circular cross-section and having an inside diameter of from 22% to 33% of the length of the filaments and the filaments being at least 18 inches in length and spaced at least 1½ inches apart and being at least 1 inch from the walls of the reactor chamber, a gas inlet tube for admitting a mixture of hydrogen and the halogenated silane into the reactor chamber in a direction substantially parallel to the filaments, the gas inlet being disposed at one end of the cylindrical reactor chamber and being spaced symmetrically with respect to the filaments, the tip of the gas inlet tube being below the bottom of the filaments and the line from the tip of the gas inlet tube to the bottom of a filament forming an angle of between 20° and 30° with respect to the vertical to the filaments, the tip of the gas inlet tube having a diameter of not over 0.10 inch, and a gas outlet tube disposed at the same end of the reaction chamber as the gas inlet tube but on the opposite side of the filaments from the gas inlet tube and near the wall of the cylindrical reactor chamber.

4. The apparatus of claim 3, wherein the inlet tube comprises two tips directed upwardly and toward each other so that jets of gas therefrom impinge on each other to produce a highly turbulent stream directed parallel to the filaments.

5. In the process of rapidly and efficiently thermally reducing trichlorosilane with hydrogen in cylindrical reactor chamber and depositing the silicon so produced on a pair of electrically heated filaments at a temperature of over 1000° C. disposed in the cylindrical reactor chamber, the steps comprising, admixing hydrogen with trichlorosilane in a mol ratio of from 12:1 to 30:1, introducing the mixture of hydrogen and trichlorosilane at a rate of in excess of 5 liters per minute into the reactor chamber at a point below the bottom of the filaments as a jet having a diameter of less than 0.10 inch at a gas velocity in excess of 200 meters per second at the jet in an initial direction substantially parallel to the filaments thereby to create a highly turbulent gas atmosphere, the direction of the gas stream being reversed after it passes beyond the upper end of the filaments so that it flows downwardly for venting and admixes with the freshly admitted mixture whereby silicon free from gases is deposited uniformly and smoothly on the filaments at a high rate, said process capable of reducing over 23% of the trichlorosilane.

6. In the process of rapidly and efficiently thermally reducing trichlorosilane with hydrogen in cylindrical reactor chamber and depositing the silicon so produced on a pair of electrically heated filaments at a temperature of over 1000° C. of a length of at least 18 inches disposed in the cylindrical reactor chamber, the diameter of the chamber being from 22% to 33% of the length of a filament, the steps comprising, admixing hydrogen with trichlorosilane in a mol ratio of from 12:1 to 30:1, introducing the mixture of hydrogen and trichlorosilane at a rate of in excess of 5 liters per minute into the reactor chamber at a point below the bottom of the filaments as a jet having a diameter of less than 0.10 inch at a gas velocity in excess of 200 meters per second at the jet in an initial direction substantially parallel to the filaments thereby to create a high turbulent gas atmosphere, the direction of the gas stream being reversed after it passes beyond the upper end of the filaments so that it flows downwardly for venting and admixes with the freshly admitted mixture whereby silicon free from gases is deposited uniformly and smoothly on the filaments at a high rate, and with over 23% of the trichlorosilane being reduced.

7. In the process of rapidly and efficiently thermally reducing trichlorosilane with hydrogen in cylindrical reactor chamber and depositing the silicon so produced on a pair of vertical electrically heated filaments at a temperature of over 1000° C. of a length of at least 18 inches disposed in the cylindrical reactor chamber, the diameter of the chamber being from 22% to 33% of the length of a filament, the steps comprising, admixing hydrogen with trichlorosilane in a mol ratio of from 12:1 to 30:1, introducing the mixture of hydrogen and trichlorosilane at a rate of in excess of 5 liters per minute into the reactor chamber at a point below the bottom of the filaments as a jet having a diameter of less than 0.05 inch at a gas velocity in excess of 500 meters per second at the jet in a substantially vertical direction thereby to create a high turbulent gas atmosphere, the direction of the gas stream being reversed after it passes beyond the upper end of the filaments so that it flows downwardly for venting and admixes with the freshly admitted mixture whereby silicon free from gases is deposited smoothly on the filaments at a high rate, and with over 23% of the trichlorosilane being reduced.

References Cited in the file of this patent

UNITED STATES PATENTS

| | | |
|---|---|---|
| 410,067 | Bower | Aug. 27, 1889 |
| 1,500,789 | Aoyagi | July 8, 1924 |
| 1,829,756 | Noddack et al. | Nov. 3, 1931 |
| 2,441,603 | Storks et al. | May 18, 1948 |
| 2,750,310 | Franke | June 12, 1956 |
| 2,854,318 | Rummel | Sept. 30, 1958 |
| 2,893,850 | Von Bichowsky | July 7, 1959 |

OTHER REFERENCES

Chemical Abstracts, vol. 51, No. 22, Nov. 25, 1957, page 17554.

Fiat Final Report 789, "Experiments to Produce Ductile Silicon," April 3, 1946.